Figure 1:
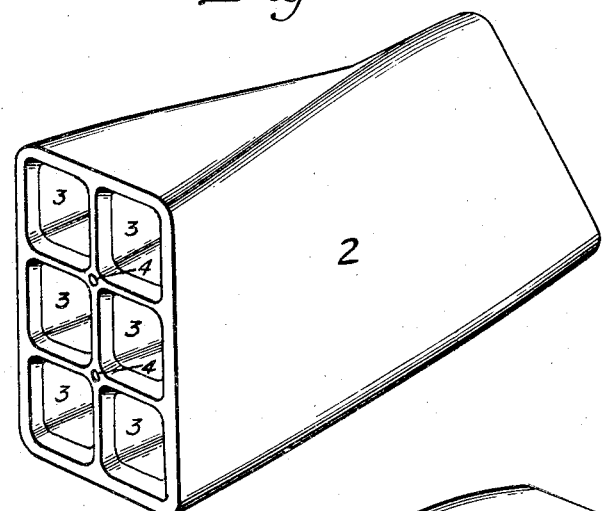

Dec. 16, 1930.　　　　　　E. BABB　　　　　　1,785,403

CONDUIT

Filed May 2, 1928

INVENTOR
Edwin Babb
by Byrnes, Stebbins & Parmelee
his attorneys

Patented Dec. 16, 1930

1,785,403

UNITED STATES PATENT OFFICE

EDWIN BABB, OF AULTMAN, OHIO, ASSIGNOR, BY MESNE ASSIGNMENTS, TO NATIONAL FIREPROOFING CORPORATION, OF PITTSBURGH, PENNSYLVANIA, A CORPORATION OF PENNSYLVANIA

CONDUIT

Application filed May 2, 1928. Serial No. 274,533.

This invention relates broadly to conduit and more particularly to conduit which is especially adapted for containing current carrying conductors. It relates still more particularly to a conduit section for use in transposing a conduit from one position to another while its general direction is maintained. A method of making such a conduit section is described and claimed in my co-pending application Serial No. 485,692, filed Oct. 1, 1930, which application is a division of this application.

My invention is particularly applicable to conduit of the multiple duct type and will be described using such type as an illustrative example. In laying a conduit for an electric installation, it is often desirable for various reasons to transpose the positions of the respective conductors while at the same time maintaining the general direction of the conduit. For instance, it may be desired to run a multiple duct main substantially in a straight line and to take off taps at intervals substantially at right angles to the main and in the same direction, but from different conductors. It is, of course, most convenient that the conductor being tapped be at such time nearest the direction in which the tap is taken off. It is consequently desirable to bring the various conductors in turn to the desired side of the conduit.

Multiple duct conduit is generally of a shape other than square or round. When laying a length of such conduit it is often necessary, due to crowded building conditions or to intersecting pipes and obstructions of various natures, to reduce the dimension of the conduit in one direction for a limited portion of its length in order to avoid such obstructions. At the same time an effective insulation must be maintained between the respective conductors and between the interior and exterior of the conduit. It is consequently impossible with the standard type of multiple duct conduit heretofore known to reduce one dimension of the conduit without impairing its insulation or necessitating the use of separate smaller sections to contain the various conductors.

When using conduit as heretofore known it has in many instances been the standard practice, due to the lack of more suitable means, to install a manhole in a conduit line solely for the purpose of changing the position of the conduit. For example, if a conduit were being laid in an upright position and an obstacle were being approached which would necessitate turning the conduit at 90° about its axis in order that the obstacle might be passed, a manhole would be inserted into the conduit line shortly before the obstacle were reached, the conduit entering the manhole in its upright position and leaving it at the opposite side in a position turned at the desired 90°. Such a construction not only involved the great additional expense of installing the manhole and the cost of the materials used therein, but also necessitated splicing of the cables or wires in the manhole, thereby entailing further expense.

I have solved the problems above set forth by the provision of the transposing conduit section which is twisted substantially about its axis. The axis of each section, and consequently of the entire length of conduit, may be substantially straight if desired and at the same time by the use of my transposing conduit sections at desired places the various conductors may be brought to desired positions and a desired dimension of the conduit may be reduced to facilitate avoiding obstacles.

I provide a transposing conduit section which is formed to turn or twist about its own axis. The section may be provided with substantially parallel end faces, the conductor containing duct or ducts extending generally in a direction perpendicular to an end face of a section but being curved about an axis substantially perpendicular to such end face. The ducts may be formed to change their position with respect to the axis of the section while not changing position with respect to each other. An element of the surface of the section will ordinarily form substantially a spiral curve. In cases where the axis of the section is a straight line the general direction of the ducts remains the same, the body of the section curving about its axis. In a multiple duct installation the ducts at one portion of the conduit may lie substantially directly one above the other and at another portion be angularly disposed with respect to the vertical. Conduit may thus be provided which at one point has its greatest dimension vertical and which gradually twists about its own axis to another point at which its greatest dimension is horizontal.

I further provide a method of making a conduit section of the type above mentioned which comprises providing a length of workable material and twisting the same substantially about its axis. A length of ceramic material may be extruded in a manner usual in the formation of electric conduit and subsequent to the extrusion may be displaced in a direction substantially perpendicular to its axis to provide for the transposition of respective portions of the conduit.

Figure 2:
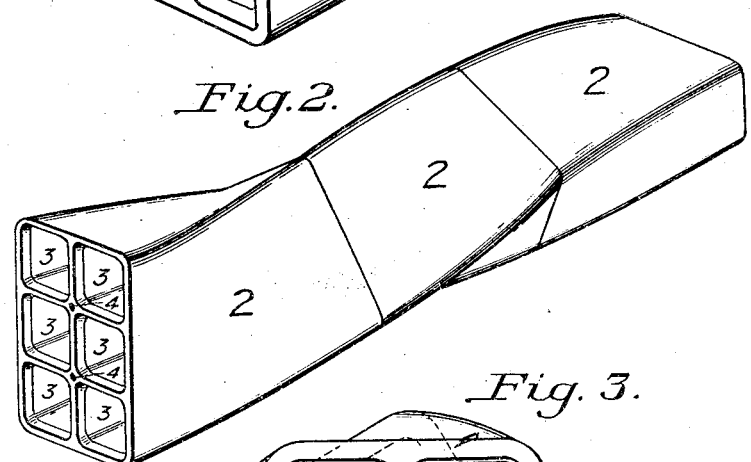
Figure 3:
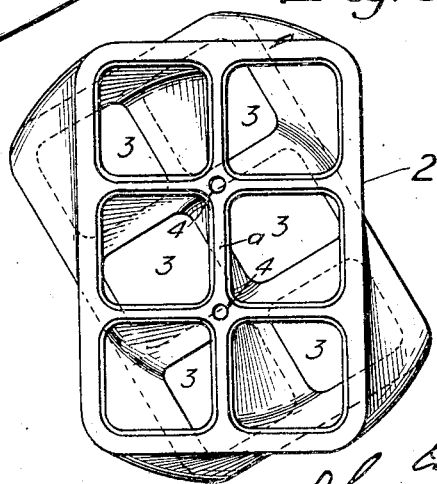

In the accompanying drawings I have shown a present preferred embodiment of the invention wherein Figure 1 is a perspective view of a transposing conduit section;

Figure 2 is a perspective view of three sections such as that shown in Figure 1, laid end to end; and Figure 3 is an end view of a conduit section such as shown in Figures 1 and 2.

Referring more particularly to the drawings, reference numeral 2 designates generally a section of conduit. It is provided with a number of ducts 3 adapted for containing current carrying conductors. The body of the section is twisted in a direction substantially perpendicular to its length so that while the general direction of the respective ducts is maintained, their position with respect to the axis of the conduit is altered, but their position relative to each other is not. The axis of the sections is a straight line, as will be apparent by viewing Figure 3 of the drawings, wherein the axis is indicated by the letter $a$. The sections are provided with dowel pin receiving holes 4.

The end faces of the respective sections are plane and substantially parallel. The angle of twist in a given length of conduit may be varied as desired and a twist of 30° in a length of two feet is found to be most satisfactory. When three sections, each two feet long and having a 30° twist, are placed end to end as shown in Figure 2, a complete quarter turn of the conduit is effected within the short space of six feet. If the conduit is being laid upright and an obstacle is encountered, three transposing sections may be inserted whereby the greatest dimension of the conduit is changed from the vertical to the horizontal and the least dimension replaces the greatest dimension in the vertical direction. The conduit may, if desired, be displaced either more or less than 90°. As will be apparent from Figure 2, an element of the surface of the conduit forms substantially a spiral curve.

A section of this type of conduit may be easily and cheaply manufactured by extruding a length of ceramic material through a die in the usual manner and then turning or twisting such length about its axis. The twisting may be effected either during the extrusion process or after it has been completed. The resultant product is baked in order to give it the desired efficiency.

While I have shown and described a present preferred embodiment of the invention, it is to be understood that the same is not limited thereto but may be otherwise embodied and practiced within the scope of the following claims.

I claim:

1. A transposing conduit section having substantially parallel end faces and having a curved duct for containing a current carrying conductor.

2. A transposing conduit section having a plurality of hollow ducts adapted to loosely contain conductors, such ducts being formed to change their position with respect to the axis of the section but not with respect to each other.

3. A transposing conduit section for loosely carrying conductors an element of the surface of which forms substantially a spiral curve.

4. A transposing conduit section of ceramic material having a duct extending generally in a direction perpendicular to an end face of the section but being curved about an axis substantially perpendicular to such end face.

5. A transposing conduit section having an axis which is curvedly formed about said axis, said section being substantially rigid.

6. A transposing conduit section whose axis is substantially a rigid straight line, an element of the surface of which forms substantially a spiral curve.

7. A transposing conduit section whose axis is substantially a rigid straight line, the body of the section curving about its axis.

8. A transposing conduit section the end faces of which are substantially congruent but whose transverse axes extend in different directions from the longitudinal axis of the section, the section being rigid.

9. A transposing conduit section the end faces of which are substantially congruent and substantially parallel but which are disposed at an angle with respect to each other about the axis of the section, the section being comprised of ceramic material.

10. A ceramic conduit for loosely carrying conductors which at one point has its greatest dimension vertical and which gradually twists about its own axis to another point at which its greatest dimension is horizontal.

11. A conduit for current carrying conductors which comprises a ceramic shell twisted in a direction substantially at right angles to its length.

12. A conduit for current carrying conductors made up of sections the end faces of which are substantially parallel, the conduit being twisted about its axis.

13. A multiple duct conduit having its ducts at one point arranged three high and two wide and at another point two high and three wide, the transition between such points being gradual, the relative positions of the ducts being unchanged.

14. A transposing conduit section having a rigid axis, the body of the section being curvedly disposed about such axis.

In testimony whereof I have hereunto set my hand.

EDWIN BABB.